(12) United States Patent  
Reinhold

(10) Patent No.: US 7,066,416 B2  
(45) Date of Patent: Jun. 27, 2006

(54) GARDEN REFUSE SHREDDING APPARATUS

(75) Inventor: Theodore W. Reinhold, Acacia Ridge (AU)

(73) Assignee: Bartlem Pty. Ltd., Queensland (AU)

( * ) Notice: Subject to any disclaimer, the term of this patent is extended or adjusted under 35 U.S.C. 154(b) by 0 days.

(21) Appl. No.: 10/872,298

(22) Filed: Jun. 18, 2004

(65) Prior Publication Data

US 2005/0023388 A1    Feb. 3, 2005

Related U.S. Application Data

(62) Division of application No. 09/786,494, filed as application No. PCT/AU99/00727 on Sep. 3, 1999, now Pat. No. 6,910,648.

(30) Foreign Application Priority Data

| Sep. 3, 1998 | (AU) | ........... PP5683 |
| Nov. 27, 1998 | (AU) | ........... PP7371 |
| Jan. 7, 1999 | (AU) | ........... PP8057 |
| Aug. 16, 1999 | (AU) | ........... PQ2249 |

(51) Int. Cl.
    *B02C 18/10* (2006.01)

(52) U.S. Cl. .......... 241/55; 241/92; 241/101.78

(58) Field of Classification Search ........... 241/101.78, 241/92, 55
    See application file for complete search history.

(56) References Cited

U.S. PATENT DOCUMENTS

| 3,412,770 A | 11/1968 | Johnson ............. 241/101.78 |
| 3,659,170 A | 4/1972 | Burkett et al. ............. 310/77 |
| 3,674,220 A | 7/1972 | Tupper et al. ......... 241/101.78 |
| 3,726,488 A | 4/1973 | Aasland et al. ........ 241/101.78 |
| 4,380,401 A * | 4/1983 | Chacour et al. ............ 384/438 |
| 4,463,907 A | 8/1984 | Biersack ................. 241/92 |
| 4,595,148 A | 6/1986 | Luerken et al. ............ 241/92 |
| 4,778,117 A | 10/1988 | Karg ..................... 241/92 |
| 4,984,747 A | 1/1991 | Lechner ................. 241/55 |
| 5,156,345 A | 10/1992 | Baker .................. 241/101.78 |
| 5,205,498 A | 4/1993 | Ostermeier et al. ......... 241/55 |
| 5,215,266 A | 6/1993 | Zimmerman ............ 241/101.7 |
| 5,231,827 A | 8/1993 | Connolly et al. ........ 241/101.1 |
| 5,240,189 A | 8/1993 | Majkrzak et al. ............ 241/55 |
| 5,381,970 A | 1/1995 | Bold et al. ................ 241/55 |
| 5,669,563 A | 9/1997 | Gearing et al. ........ 241/101.78 |
| 5,707,017 A | 1/1998 | Paolucci et al. ............ 241/55 |

FOREIGN PATENT DOCUMENTS

| AU | 499085 | 11/1975 |
| AU | 501652 | 10/1979 |
| GB | 2259872 | 3/1993 |
| GB | 2261616 | 5/1993 |

* cited by examiner

OTHER PUBLICATIONS

PCT Search Report for International Application No. PCT/AU99/00727 dated Dec. 8, 1999 (3 p.).

*Primary Examiner*—Mark Rosenbaum  
(74) *Attorney, Agent, or Firm*—Conley Rose, P.C.

(57) ABSTRACT

This invention provides garden refuse shredding apparatus (10) which has a chipping rotor (20) supported for rotation about a vertical shaft (31) in a chamber (11) which has a hopper (14) which feeds refuse to radially disposed elongate chipper blades (30) which span a major part of the rotor (28). Fan blades (44) are supported on the rotor for creating an airflow through the hopper (14) to assist feed to the chipping rotor and to assist discharge of shredded refuse from the outlet (45). The chipping rotor (20) is driven directly from the vertical output shaft (36) of an electric motor or a petrol engine (21).

13 Claims, 16 Drawing Sheets

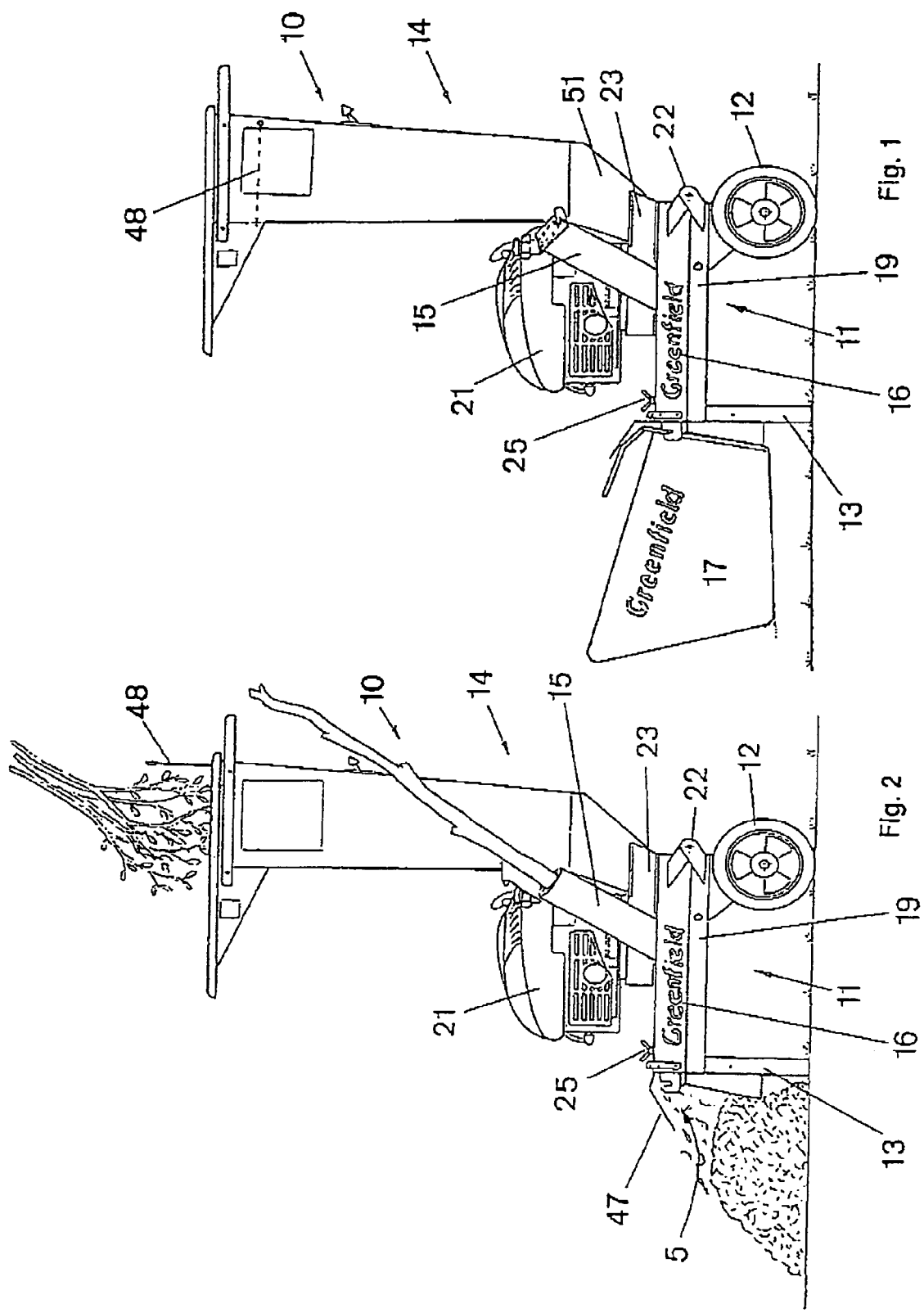

GARDEN REFUSE SHREDDING APPARATUS

This application is a Division of U.S. application Ser. No. 09/786,494, filed Jun. 26, 2001, now U.S. Pat. No. 6,910,648, which is a 371 of PCT/AV99/00727 filed Sep. 3, 1999.

TECHNICAL FIELD

This invention relates to garden refuse shredding apparatus suitable for shredding leaves twigs palm fronds and small branches.

BACKGROUND ART

Many types of garden refuse shredders are currently available and typically they include an inlet hopper which can be loaded with garden refuse for shredding as well as a small bore inlet tube for introducing small branches to be shredded. Mostly these machines utilise a flail assembly at the base of the hopper for shredding material fed through the hopper and a separate chipper assembly at the base of the small bore inlet tube for chipping small branches introduced therethrough.

Disadvantages associated with these types of shredders stems from their relative complexity often making servicing, such as drive belt and blade sharpening operations, difficult and unreliable. Furthermore the flail assembly is often readily accessible from the underside of the machine making them dangerous for operation around children. In addition the flail assembly shreds green leafy material to a very fine form which may not be the most suitable for garden mulching operations Attempts have also been made to provide garden refuse shredding apparatus based on a simple shredding rotor such as is used in domestic rotary mowers. However because of the nature of materials which are fed to such apparatus such as long fibrous articles including palm fronds, long grass and tree refuse, it is common for the material to become entangled about the drive shaft of the spinning rotor. This entanglement can build up to such extent that it jams the machine and prevents further operation thereof or substantially reduces the efficiency of operation of the processor.

In some instances such entanglement about a drive shaft can damage seals and the like which extend about that drive shaft. Any build-up of such refuse is also undesirable as it will impede the throughput of refuse and cause fouling about the drive shaft.

Garden refuse shredders and other driven garden appliances are often operated by stand-alone petrol engines and electric motors fed by a power cord from the mains. Mains fed electric motors may be switched on and off remotely from the implement without knowledge of the user. This can lead to dangerous operating conditions as when operated many such electrical implements operate relatively silently. Inadvertent contact with a active parts of the implement may result with consequent injury to a user. This is particularly so in the case of garden refuse shredders where operators may wear ear muffs and where the spinning chipper rotor if contacted may cause instant serious injury.

While it is possible to provide override switches and the like to minimise such accidental occurrences, it is difficult to shield against careless operating practices while maintaining simplicity and reliability of the apparatus.

Aspects of the present invention aim to alleviate one or more of the above disadvantages and/or to provide garden refuse shredding apparatus which will be reliable and efficient in use.

DISCLOSURE OF INVENTION

With the foregoing in view, this invention in one aspect resides broadly in garden refuse shredding apparatus including:— a chamber having a refuse inlet and an outlet for shredded material;

fan means for creating an outflow of air from said outlet a shredding rotor supported for rotation in the chamber;

at least one elongate chipper blade fixed for rotation with the rotor and extending inward from adjacent the outer periphery of the rotor:

a respective aperture through the rotor in front of the or each chipper blade through which material shredded by the chipper blade may pass;

a feed hopper for directing refuse through the refuse inlet into the chamber in the path of the chipper blade or blades, and drive means for rotating the rotor.

Suitably the fan means are supported on the rotor and induce an air flow through the feed hopper so as to assist in induction of material introduced to the feed hopper into the housing and each elongate chipper blade extends inward from adjacent the outer periphery of the rotor substantially to or beyond the half radius position of the rotor.

Alternatively an air flow may be induced by an exhaust fan associated with the outlet from the chamber and air may be introduced either through the hopper or elsewhere. The induction may be such as to cause the feed of refuse from a storage into the chamber or the feed hopper may feed gravationally into the chamber and the air flow may be used to assist induction of the refuse into the chamber.

The shredder may include a pipe inlet through which branches and the like are fed to the shredding rotor which is suitably in the form of a heavy rotor having one or more relatively long chipper blades mounted thereon adjacent a complementary aperture through the rotor.

The or each chipper blade suitably has an outer portion which passes across the pipe inlet and the outer portion of the inlet, while the inner portion of the chipper blades passe only across the inner portion of the inlet. For example the inlet is suitably particular and extends across about between one-half and three-quarter of the rotor's radial extent, while the pipe inlet extends across about the outer one-quarter to one-half of the rotor's radial extent. More suitably the inlet extends across two-thirds of the rotor's radial extent, while the pipe inlet extends across one-third of the rotor's radial extent.

In one desired form which utilises gravity feed of refuse to the chamber, the teed hopper extends upwardly from an upper end wall of a chamber in which a shredding rotor is supported for rotation about an upstanding axis and fan blades are mounted on the shredding rotor at the side thereof remote from the feed hopper, the fan blades forming the fan means.

The shredding rotor may be supported for rotation about a horizontal axis or an inclined axis. It is preferred that the shredding rotor be mounted for direct drive from the output shaft of the drive motor which may be an electric motor or an internal combustion engine. In the case of an internal combustion engine it is preferred that the shredding rotor be fixed to a hub which rotates with the output shaft of the motor. Suitably the hub extends about the output shaft and is supported by a bearing mounted to an end wall of the chamber.

The chipper rotor and bearing may be supported on the lower end wall and be connected to the motor such as by a splined or dog connection. Suitably however both the motor and the bearing for the hub are mounted to the upper end wall of the chamber containing the shredding rotor. Preferably the bearing is of the type which isolates end and radial loads applied by the shredding rotor from the engine. In this manner the outer end of the output shaft is supported by the hub bearing against loads imposed by the rotor.

Preferably the hub bearing is a self-aligning bearing of the type which may be locked to the hub, such as a self-aligning cam-lock sealed ball bearing, which is locked to the hub after adjusting end play of the engine shaft so as to reduce end loads being transferred to the crankshaft of the engine. For this purpose it is preferred that the engine is supported on a bracket above the hub bearing in such manner that access may be gained to the hub bearing for locking purposes after securing of the rotor to the output shaft. This arrangement provides a very simple and cost effective means of achieving reliable operation with direct drive from an internal combustion engine.

It is desirable that the shredding rotor be provided with means to prevent stringy material from becoming entangled about the hub of the rotor. In one form this includes the provision of macerator blocks or blades mounted on the rotor and co-acting with complementary fixed blocks or blades mounted on the end wall of the rotor housing.

In a particular embodiment of the invention the shredding rotor is enclosed for rotation within a two part housing and is supported for rotation from a nominally horizontal upper end wall of an upper housing portion which also carries the motor and the hopper and which is hinged to a lower housing portion from which the upper housing portion may be pivoted to an open position to expose the shredding rotor. In this form the lower housing part is suitably supported on skids or wheels.

This configuration of the rotor housing also constitutes another aspect of this invention and may be utilised to advantage without being limited to utilising the particular shredding apparatus described above.

Similarly the configuration of the motor and rotor mounting utilising a separate bearing to isolate the rotor loads from the direct mounted motor shaft constitutes a further aspect of this invention and may be utilised to advantage without being limited to utilising the particular shredding apparatus or housing described above.

It is also preferred that in this form the upper housing parts be provided with suspension means for suspending a catcher across an outlet aperture in a side wall of the housing. Suitably the catcher is mounted remote from the hinging mechanism and preferably the outlet constitutes the end of a volute shaped housing which provides an expanding path to the outlet. It is also preferred in such arrangement that an induced air draught by utilised to assist in feed through the feed hopper and discharge of shredded material through the outlet.

In a further aspect this invention resides broadly in a method of inhibiting entwinement of elongate articles about the drive shaft of rotary processing members, the method including:— forming a barrier wall about the drive shaft to substantially conceal access between the walls from and to which the drive shaft extends to the rotary processing member, and providing complementary disrupting members on the respective walls from and to which the drive shaft extends to the rotary processing member, the disrupting members comprising fixed and stationary members which pass closely adjacent one another upon rotation of the rotary processing member so as to disrupt material tending to pass to the drive shaft.

The disrupting members may be arranged between the drive shaft and the barrier wall or at the side of the barrier wall which is remote from the drive shaft. Suitably the access path across the barrier wall and past the disrupting members in a circuitous or labyrinth path.

The complementary disrupting members may be a plurality of substantially identical complementary disrupting members arranged concentrically about the drive shaft. Each of the complementary disrupting members may be a pair of anvil members which rotate past one another such as a pair of opposed pins or blades.

Suitably each of the complementary disrupting members includes a fixed anvil member such as a cylindrical projection and a blade member which passes closely adjacent exposed side and end faces of the cylindrical projection. In one embodiment the or each cylindrical projection is constituted by the cylindrical head of a high tensile cap screw or bolt.

The method of inhibiting entwinement of elongate articles about the drive shaft of rotary processing member may also include providing air flow or pressure distribution arrangements about the drive shaft whereby matter disrupted by the complementary disrupting members is induced to flow away from the drive shaft.

In another aspect this invention resides broadly in rotary processing apparatus of the type including a drive shaft extending from a fixed wall to an adjacent wall of a processing member driven for rotation by the drive shaft, the rotary processing apparatus including:

a barrier wall mounted on one of said fixed or adjacent walls about the drive shaft and terminating close to the other wall, and complementary disrupting members extending from respective said fixed and adjacent walls so as to pass closely adjacent one another upon rotation of the adjacent wall relative to the fixed wall.

A plumber block or the like bearing is suitably mounted on top of a horizontal fixed wall so as to support the rotary processing apparatus and cap screws, ie screws or bolts having cylindrical heads with a socket for receiving a key or the like, disposed equidistant from the axis of the drive shaft pass upwardly through the fixed wall into the base of the plumber block or the like and act as fixed disrupting members which cooperate with blades mounted on the adjacent wall. Suitably the blades have a horizontal part which terminates close to the outer ends of the cap screws and a vertical part which terminates close to the side walls of the cap screws.

In yet a further aspect this invention resides broadly in a rotary processor such as garden refuse shredder having a driven shaft driving a shredder mounted within a housing, an inlet to the housing for refuse to be shredded and an outlet from the housing for discharging shredded refuse, wherein:

impeller means are associated with the shredder for inducing an inflow to the housing through the inlet and an outflow from the housing through the outlet. Suitably the housing provides an expanding travel path for material entering through the inlet and passing to the outlet and more suitably this travel path is in the form of a volute or the like. The drive shaft may be driven by an electric motor or by an internal combustion engine, in which case it is preferred that the shredder be mounted on the output shaft but supported by bearing means independent of the internal combustion engine. The drive shaft may be a horizontal shaft or a substantially vertical shaft. The shredder is suitably a relatively heavy disc supporting chipper blades thereon and having apertures therethrough in front of the blades and through which shredded refuse may pass to be discharged.

In an electrically driven form of this invention in which the shredding rotor is supported on the output shaft of an electric motor, the shredding rotor suitably includes a friction brake biased to an engaged attitude so as to cause the shredding rotor to slow quickly to a stopped position once electrical power to the driving motor has ceased and a manual on/off control associated with an onboard electrical switch which controls the supply of electricity to the motor such that when the control is moved to the on position for supplying electricity to the motor the brake is maintained in a disengaged position and when the control is moved to the off position the brake is freed for stopping the shredding rotor.

Suitably the brake is a single shoe brake carried on a lever for movement to and from its engaged attitude and cooperable with a switch in its disengaged position to supply electricity to the motor. The brake is suitably arranged as a leading shoe brake such that the effort to operate the brake effectively is reduced.

The shredding rotor may also be supported within a shredder housing which is opened to provide service access to the shredding rotor and suitably a latching arrangement is provided for holding the brake lever or other manual on/off control when in the on position in a blocking position blocking the opening of the shredder housing.

The shredding rotor may be supported in a volute shaped housing and be provided with wind vanes for creating an air flow therethrough from the refuse inlet to the outlet from the shredder housing.

A barrier wall may be provided about the output shaft of the motor as a guard against elongate fibrous articles becoming entwined about the shaft. Cutters mounted on the rotor of the shredding rotor and arranged to pass across fixed anvils may be provided to disrupt fibrous articles that pass toward the output shaft also with a view to preventing elongate fibrous articles becoming entwined about the shaft and in a further aspect of this invention the cutters are suitably in the form of hardened plates extending upwardly through slots through the rotor to pass close to the fixed anvils. Each plate may be welded to a mounting flange which is bolted to the underside of the rotor and preferably with bolts which trail the plate.

BRIEF DESCRIPTION OF DRAWINGS

In order that this invention may be more readily understood and put into practical effect, reference will now be made to the accompanying drawings which illustrate a typical embodiment of the invention and wherein:—

FIG. 1 is a side view of the shredding apparatus fitted with a catcher:

FIG. 2 is corresponding view but shown without a catcher;

MODES FOR CARRYING OUT THE INVENTION

Figure 3:
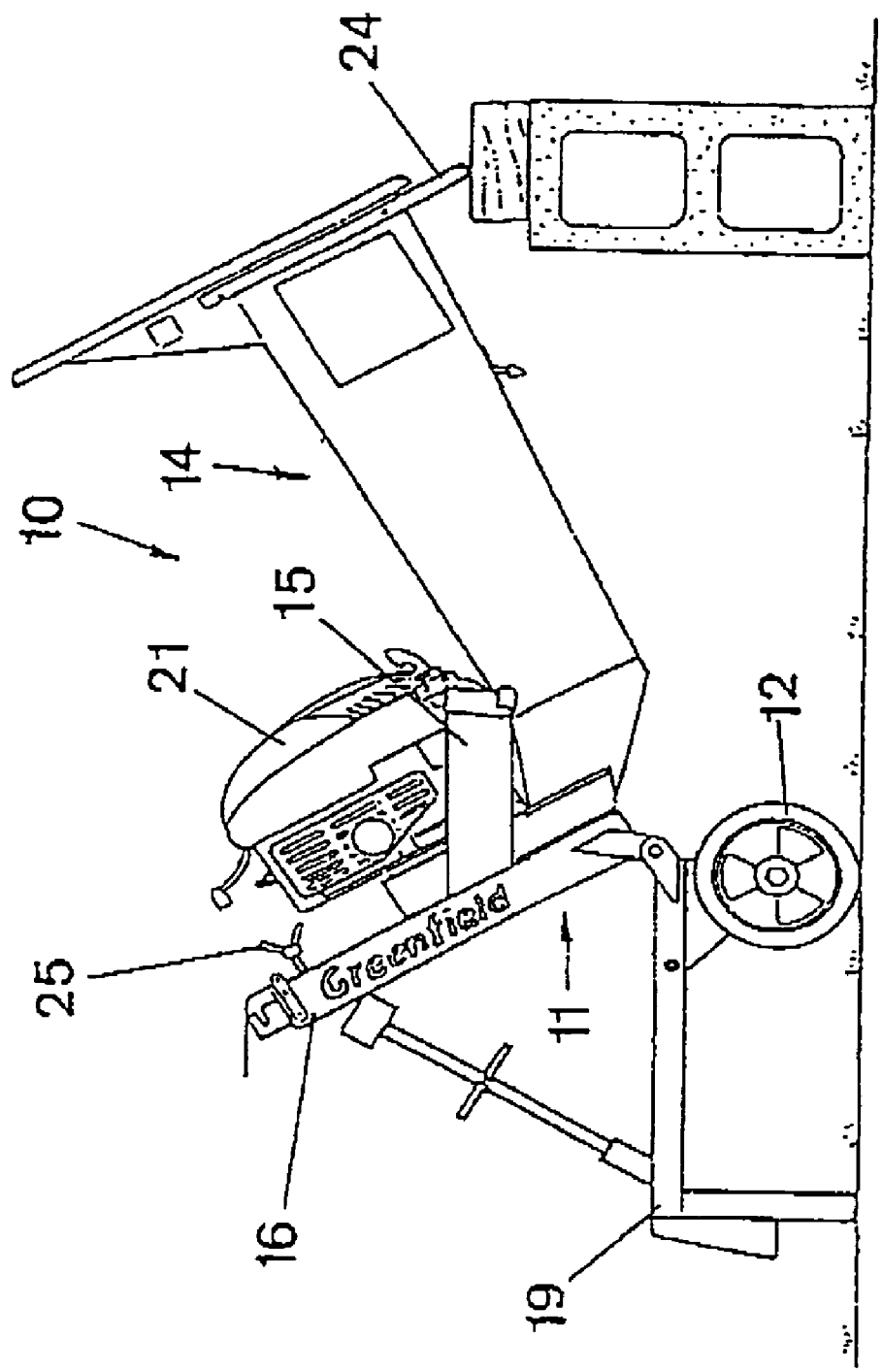
FIG. 3 illustrates the shredding apparatus disposed in a servicing mode.

The garden refuse shredding apparatus 10 illustrated in the drawings has a two-part housing 11 supported on rear wheels 12 and a front stand 13, a feed hopper assembly 14 and a small bore inlet tube 15 extending upwardly from the upper housing part 16 and a catcher 17 suspended from the front of the housing 11.

Figure 4:
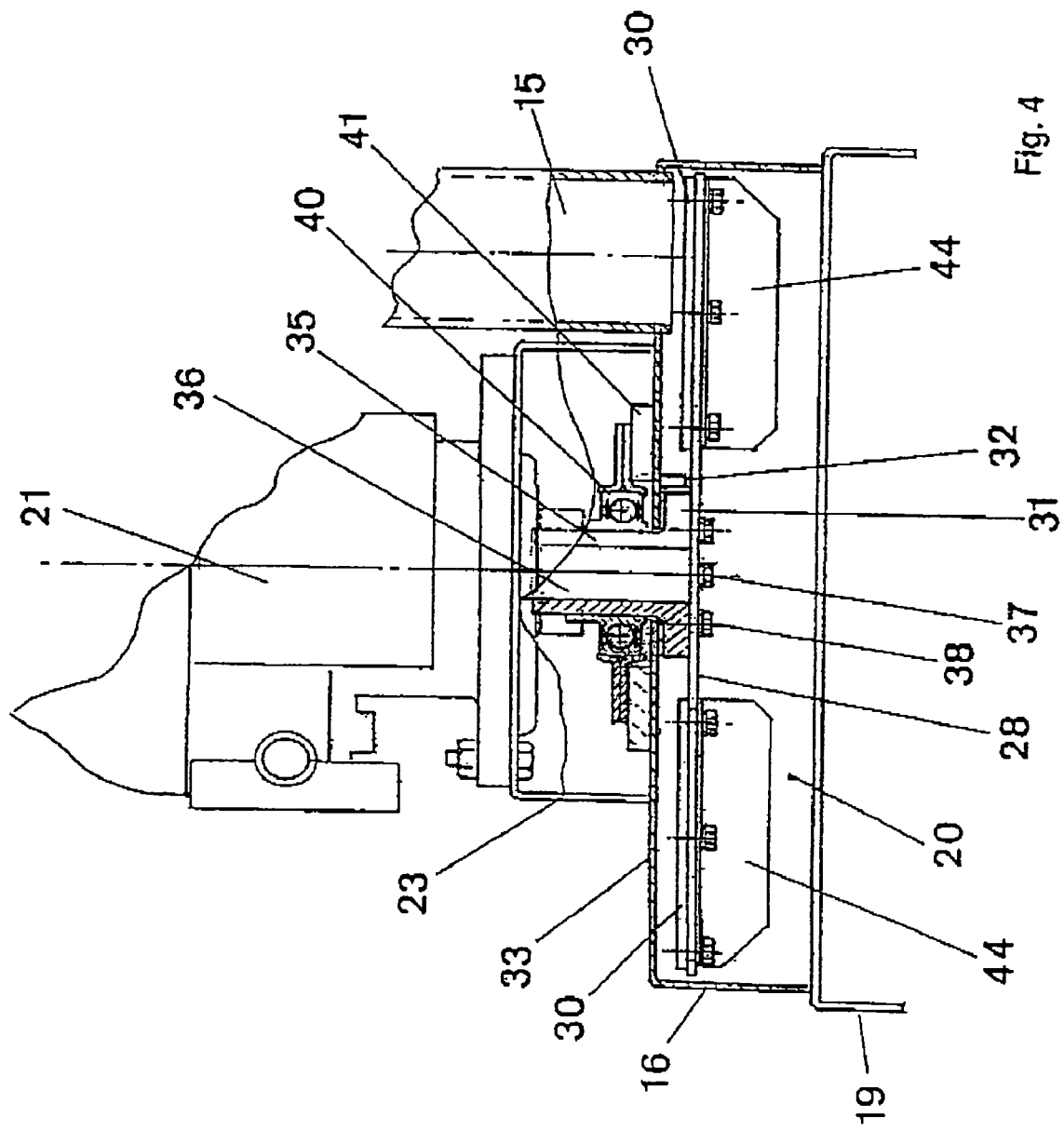
FIG. 4 is a part-sectional view of the rotor and its mounting.

The housing 11 contains a shredding rotor assembly 20, illustrated in FIG. 4, and supports a small petrol motor 21 thereabove for driving the shredding rotor assembly 20. Opposed pin hinges 22 attach the upper housing part 16 to the lower housing part 19 at the rear thereof which enable the upper housing part 16 and the components mounted thereon to fold to an open position as illustrated in FIG. 3, at which the handle 24 rests on the ground and clear access is provided to the shredding rotor assembly 20 through the open underside of the top housing part 16. The front of the top housing part 16 is retained on the lower housing part 19, in use, by bolts 25.

Figure 5:
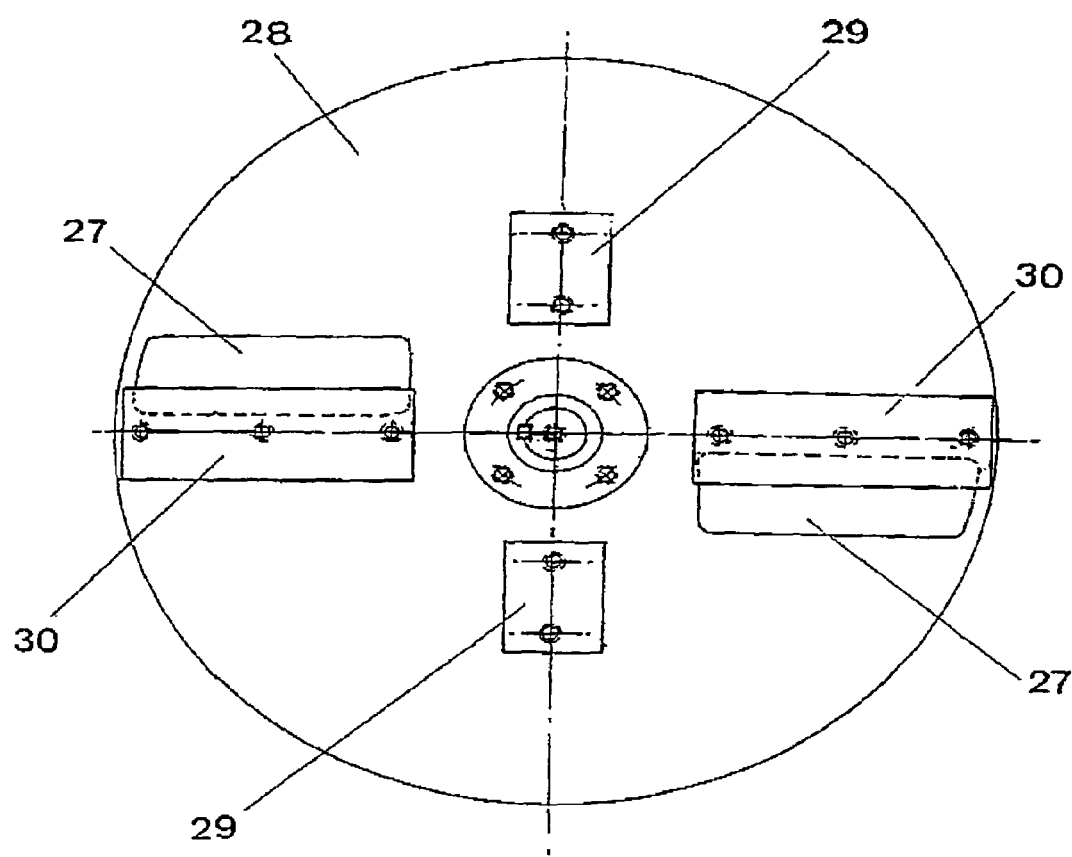
FIG. 5 is a cutaway plan view of the rotor assembly.

As illustrated in FIGS. 4 and 5, the shredding rotor assembly 20 has a disc-like rotor 28 formed with opposed radially extending slots 27 at diametrically opposite positions and a chipper blade 30 bolted to the rotor 28 adjacent the trailing side of each slot 27.

Macerator blocks 29 are interposed between the blades 30 and are fixed to the rotor 28 with inner ends spaced from the hub 31 to which the rotor 28 is bolted. Pins 32 extends down from the end wall 33 of the upper housing part 16 toward the rotor 28. The pins are positioned between the hub 31 and the macerator blocks 29.

The hub 31 is formed at the lower end of a thick-walled sleeve 35 which is bored to accept the output shaft 36 of the motor 21 which is keyed thereto by a key in conventional manner. The lower end of the motor shaft 36 is threaded to receive a retaining bolt 37 which pulls the rotor 28 against the end of the shaft 36. The rotor is also bolted to the hub 31 by bolts 38.

The sleeve 35 is supported by a large capacity self-aligning cam-lock bearing 40 which is secured to the end wall 33 through a stiffening boss 41. This bearing is locked to the motor shaft 36 so as to support the weight of and end thrust placed upon the rotor 28.

The bearing 40 also accommodates the side and impact loads imparted by the operation of the chipper blades 30. This isolates undesirable loads being applied to the crankshaft of the directly mounted motor 21 which is supported on a channel shaped mounting 23 fixed to the end wall 33. The rotor 28 is relatively heavy and acts as a flywheel and in a typical embodiment is formed from 5 mm thick steel plate.

The underside of the rotor 28 has impeller blades 44 bolted thereto so as to create an air flow through the open front 45 of the housing 11. This induces a downdraught through the feed hopper assembly 14 and the small bore inlet tube 15 which assists in feeding material to be mulched therethrough toward the rotor 28. A closure cap may be provided for the tube 15 to increase the draught through the hopper assembly 14.

The induced draught also carries shredded material through the outlet which is normally closed by a flap 47 hinged along its upper edge and pivotable upwardly to permit a conventional grass catcher 50 to be removably clipped to the housing 11 to receive the shredded material It will be seen that the feed hopper assembly 14 has a forwardly convergent transition piece 51 extending from its underside to the inlet aperture 52 formed in the top wall 33, while the inlet tube 15 is angled back to assist feeding of the material introduced therethrough.

In use when the rotor 28 is rotated at high speed, air is induced to flow through the feed hopper assembly 14 and inlet tube 15, which may be capped if desired. This air flow assists in the feeding of material to be shredded to the rotor 28. Most of this matter will be shredded by the chipper blades 30 and pass through the apertures 27 for discharge to the catcher.

Should refuse move across the top of the rotor 28 toward the hub 31 it will be contacted by the macerator blocks 29 and be pulverised. The air draft induced by the fan blades 44 will assist in discharging the pulverised material.

In the event that the chipper blades need servicing, they can be accessed easily by releasing the bolts 25 and pivoting the top housing part to its open position as illustrated in FIG. 3. In this position the rotor 28 is stably supported for safe working conditions.

An inlet safety flap 48 is pivotally attached to the upper end of the hopper to close the hopper after the addition of material to be shredded. The flap 48 does not extend fully to the front wall 53 of the hopper 14 so as to provide an opening or air flow gap for maintenance of a desirable air flow through the feed hopper 14 to assist with the feeding and/or discharge process.

Figure 6:
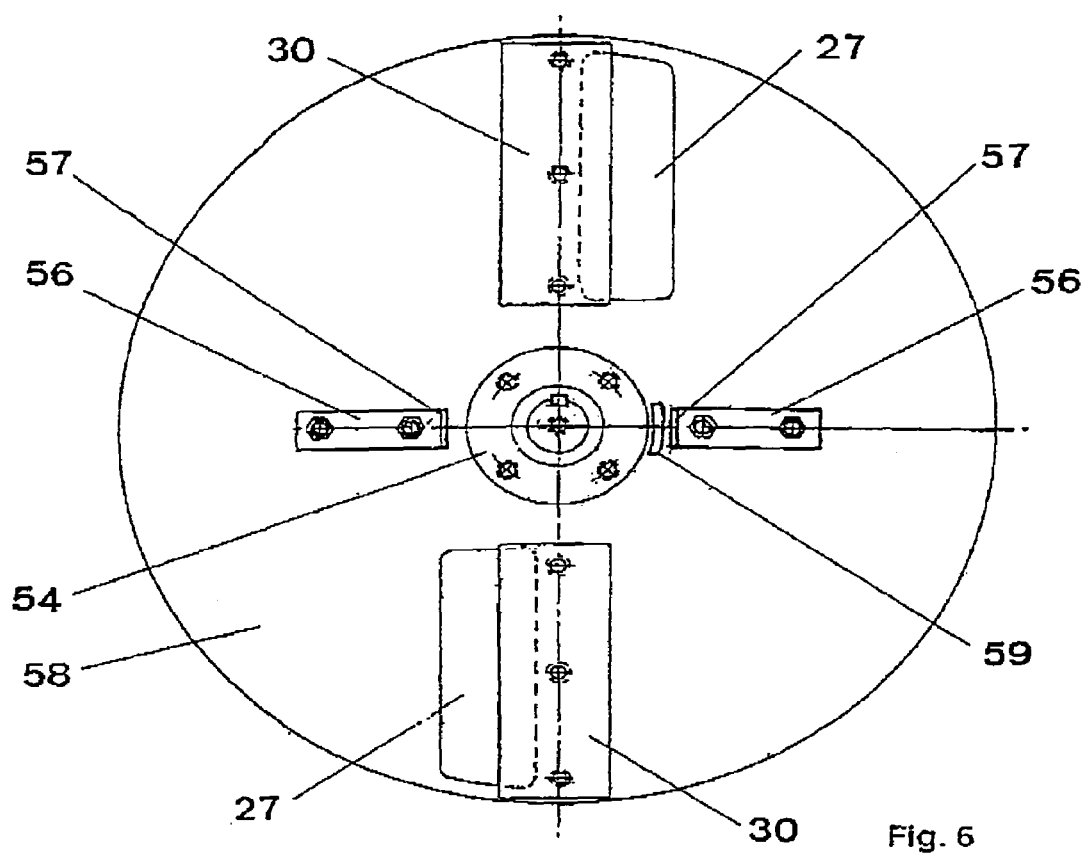
FIGS. 6 and 7 illustrates in plan and side sectional views a further embodiment of the rotor assembly.
Figure 7:
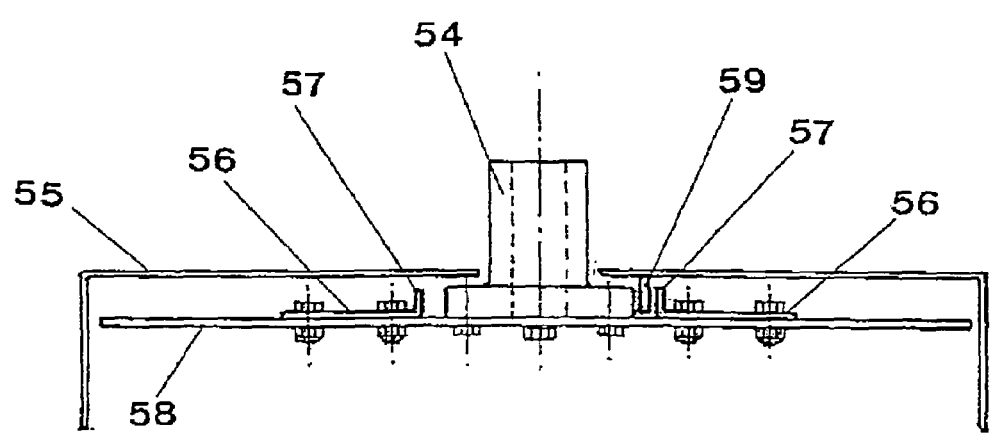
Figure 8:
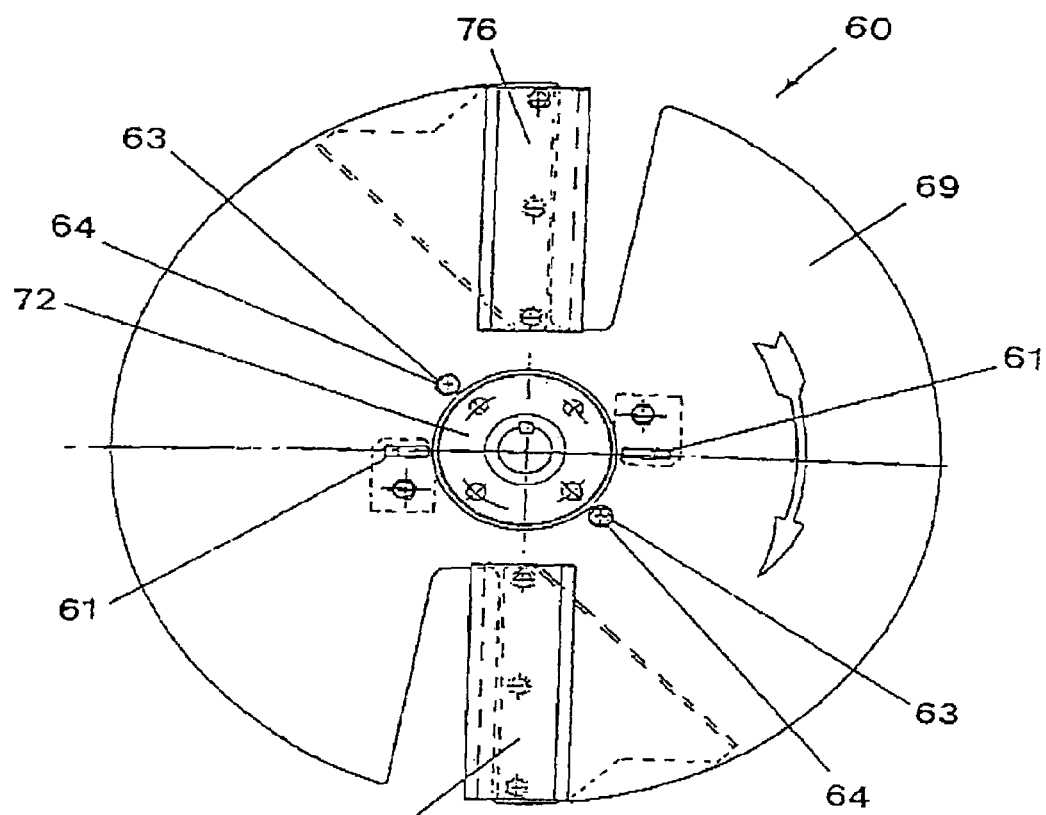
FIGS. 8 and 9 illustrates in plan and side sectional views a further embodiment of the rotor assembly and its mounting details.
Figure 9:
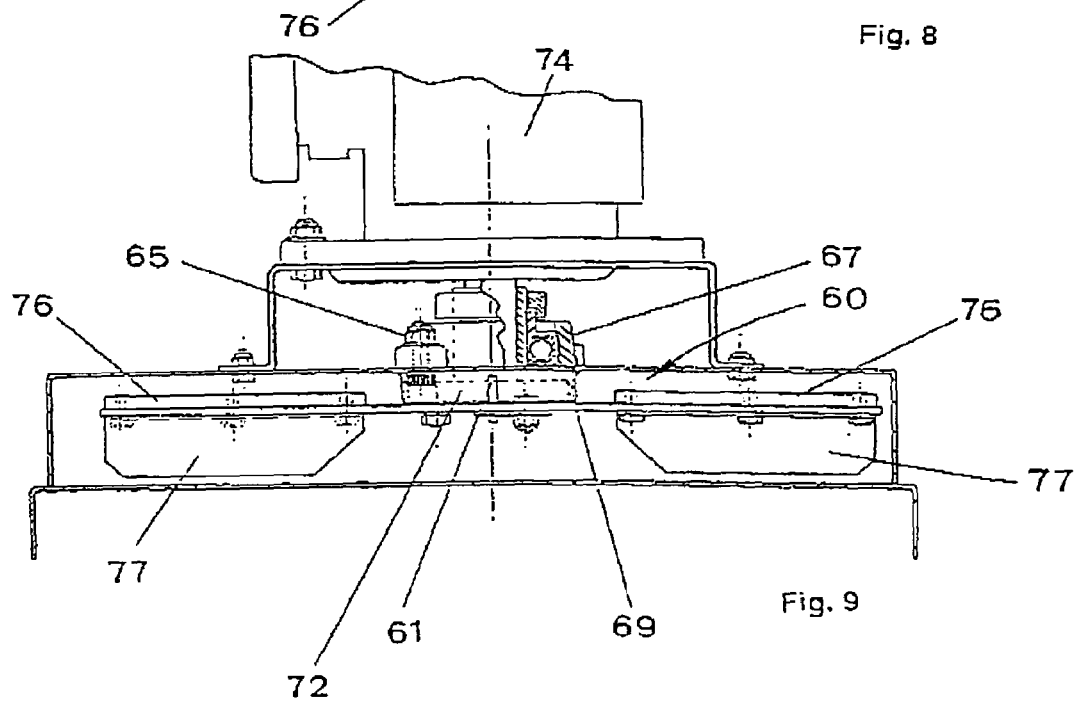

An alternate rotor 58 illustrated in FIGS. 6 and 7 carries opposed blades 56 formed with upturned inner ends 57 to provide cutters which co-act with complementary arcuate blade 59 centred on the rotor axis and fixed to the end wall 55 of the upper housing part. The cutters 57 pass close to the blades 59 and cut up long strands of matter which may be fed toward the boss 54. However the rotor arrangements of FIGS. 4 to 7 are not particularly suited to coping with various types of refuse such as palm frons for example. These are more efficiently coped with by the shredding rotor assembly illustrated in FIGS. 8 to 13 and described below.

The preferred form of shredding rotor assembly 60 has opposed blades 61 bolted to the rotor 69 and formed with upturned cutting or disrupting ends 62 which are L-shaped to pass closely about the end face 63 and side face 64 of circular anvils 65 which in this embodiment are constituted by Allen head bolts which bolt the end wall 66 to the robust housing of the cam-lock nearing 67. The bolts 65 are high tensile bolts which have relatively deep serrated cylindrical heads. With this arrangement the close spacing between the L-shaped ends 62 with the side and end faces of the bolts 65 will not vary with rotation of the bolts 65.

An annular barrier wall 70 extends down from the end wall 66 to terminate closely adjacent the rotor 69. The barrier wall 70 closely accommodates the lower mounting flange 72 of the hub assembly 71 which is carried by the cam-lock bearing 67. This hub is keyed to the driveshaft 73 of the motor 74 and a central retaining bolt extends through the rotor 69 into the driveshaft 73.

Figure 10:
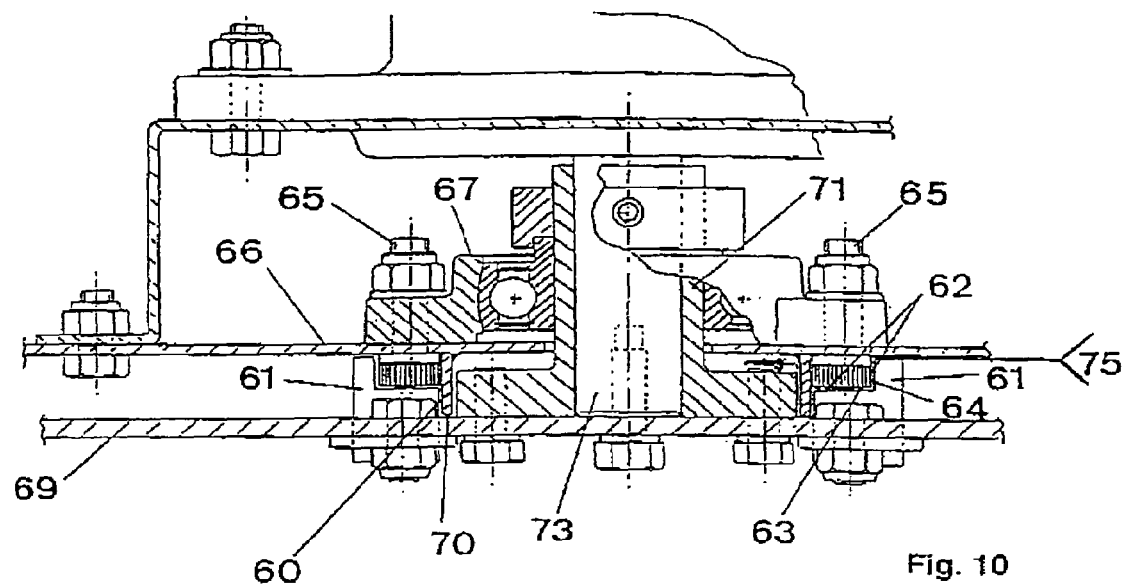
Figure 11:
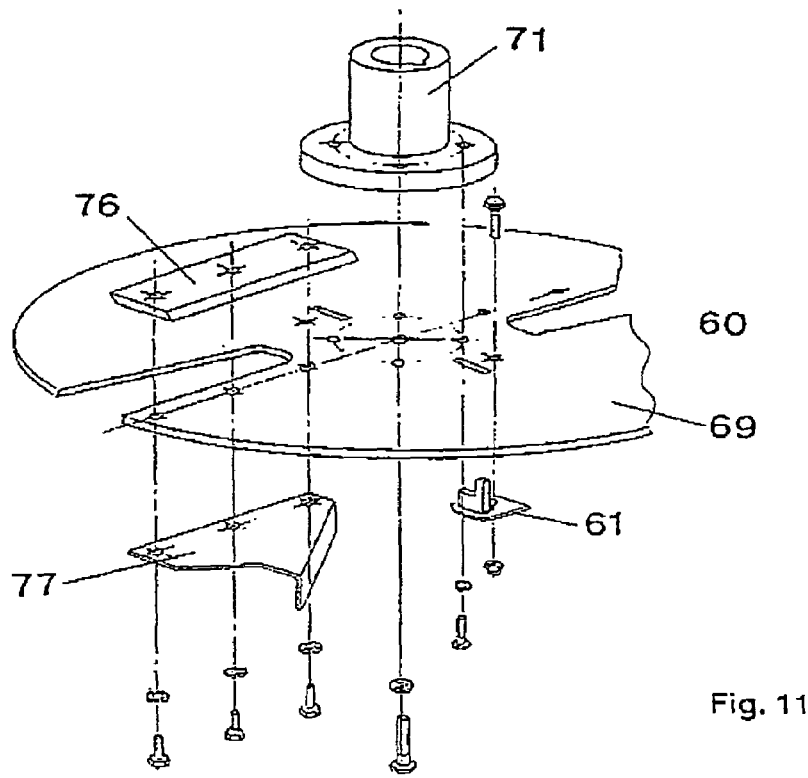

As can be clearly seen in FIG. 10, when the blades 61 are in line with one of the bolts 65 the only path thereacross to the hub assembly 71 is a circuitous or labyrinth path as indicated by the arrow 75, and being first about the side and end face of the bolts 65 and then past the barrier wall 70. This will provide an effective barrier against elongate fibrous articles entwining about the shaft. Material which travels inward beyond the chipper blades 76 will be resisted by the barrier wall 70 where it will be cut up or disrupted and then forced outwardly either by the motion of the rotor or the air flow across the rotor 69. The through bolts for the chipper blades 76 also secure the impeller blades 77 to the rotor 69.

Figure 12:
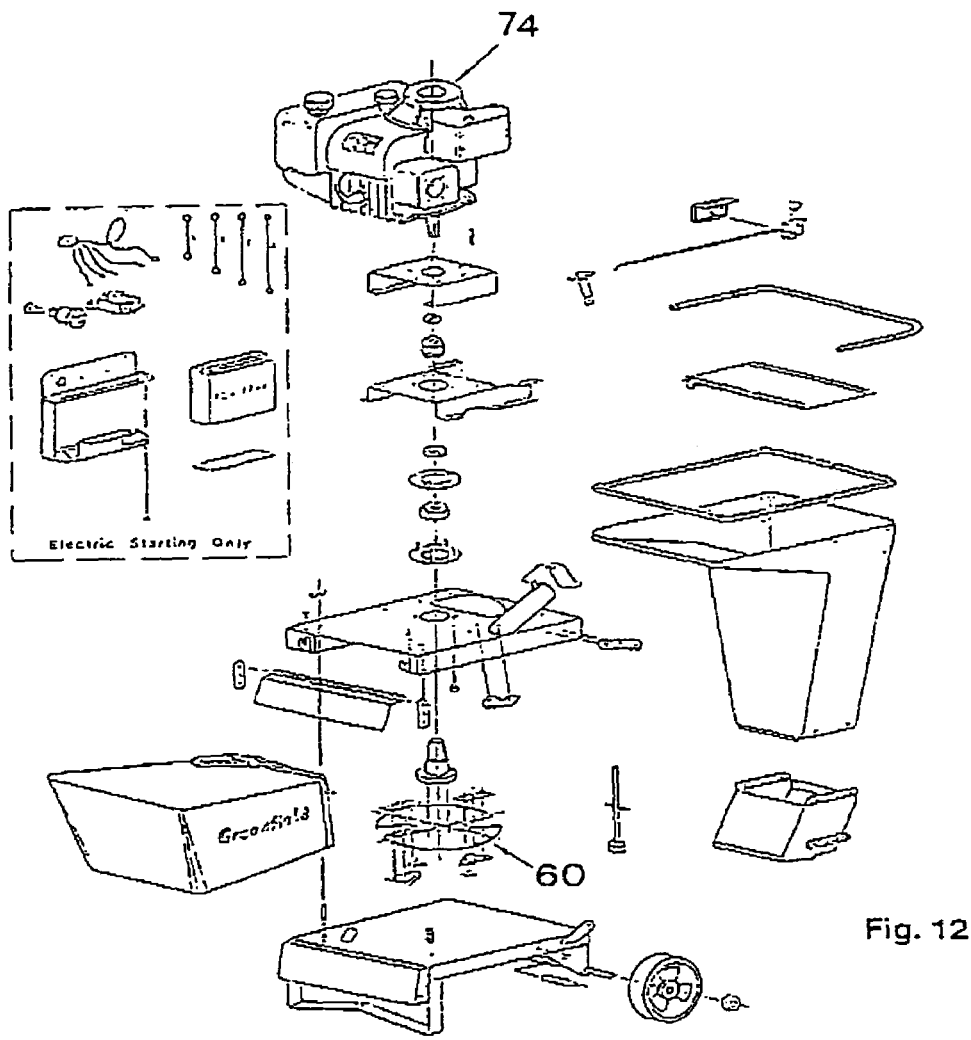
Figure 13:
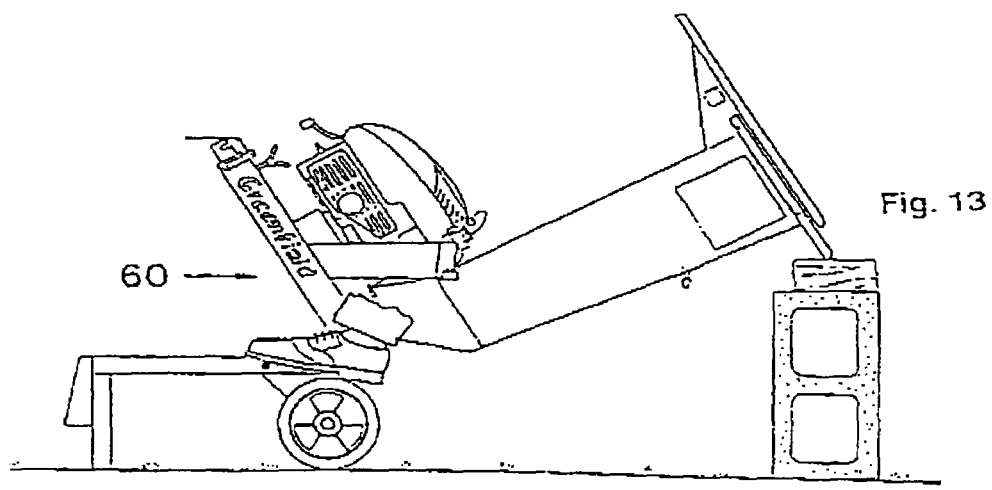

FIG. 12 illustrates the simple and easy to manufacture nature of the shredding apparatus, being formed mostly of folded sheet metal bolted together and punched for bolt on mounting of the components such as the motor and bearing assembly, while FIG. 13 illustrates the ease of servicing the working components which are normally concealed within the rotor housing.

This arrangement provides a shredder of very simple form which has the bulk of its weight centralised between the wheels 12 and the stand 13 for stable operation. The weight of the hopper is offset by the catcher and the handle 24 provides for simple balanced wheeling of the shredder 10 from location to location and support for the opened housing.

Figure 14:
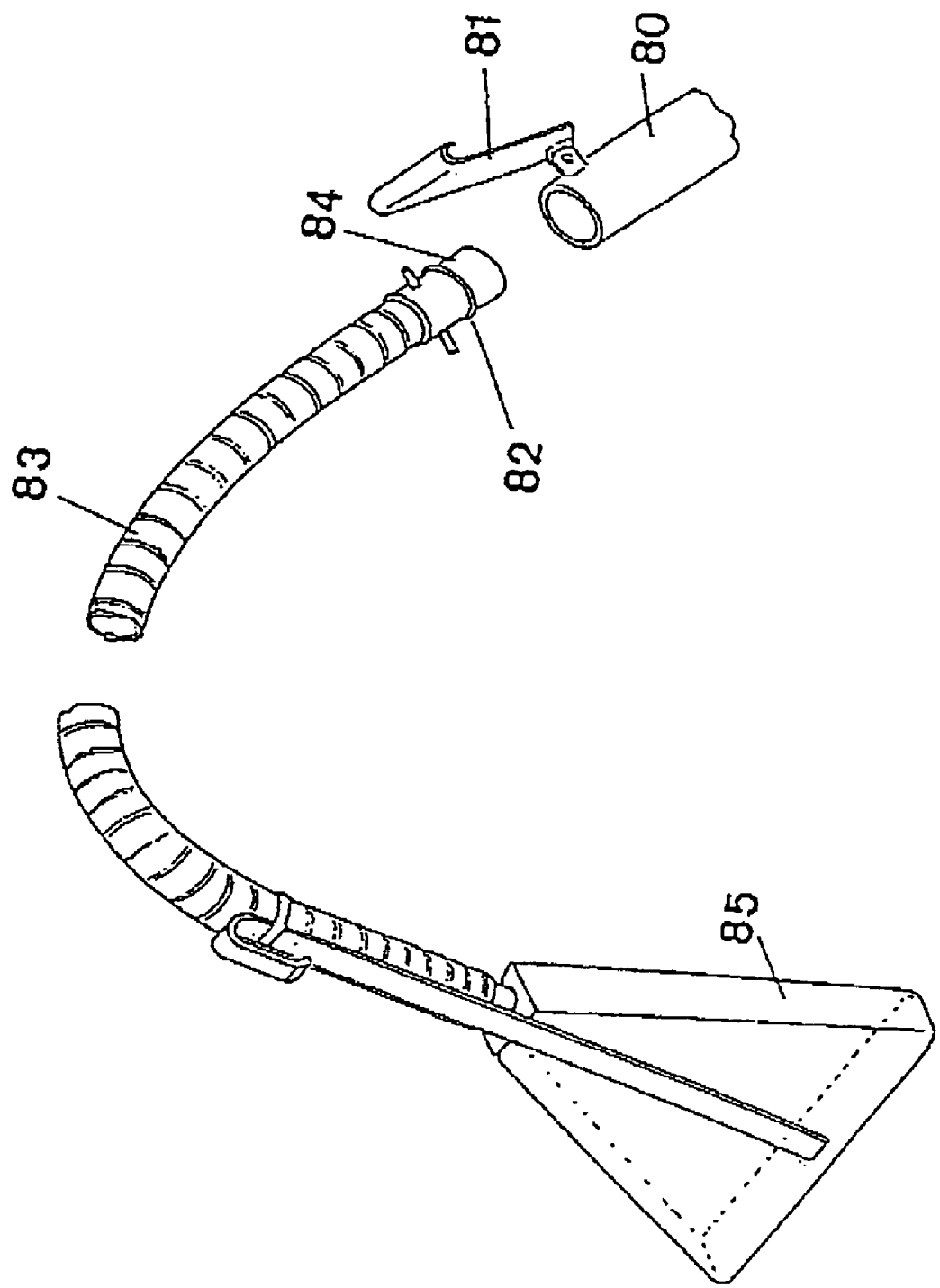

As illustrated in FIG. 14, the inlet tube 80 is provided with a pivoted closure flap 81 which normally falls down to a position at which it closes the tube 80, thus assisting in maintaining a relatively high air flow through the inlet chute 14 to assist flow of refuse to the chipper blades. A coupling 82 at the end of a flexible hose 83 is provided with an external sealing ring 84 and it plugs into the upper end of the pipe 80. The outer end of the hose 83 terminates in a suction nozzle and handle assembly such as is illustrated diagrammatically at 85. Blocking means may also be provided for the partially open inlet chute to assist in creating a suitable vacuum effect at the nozzle 85.

Figure 15:
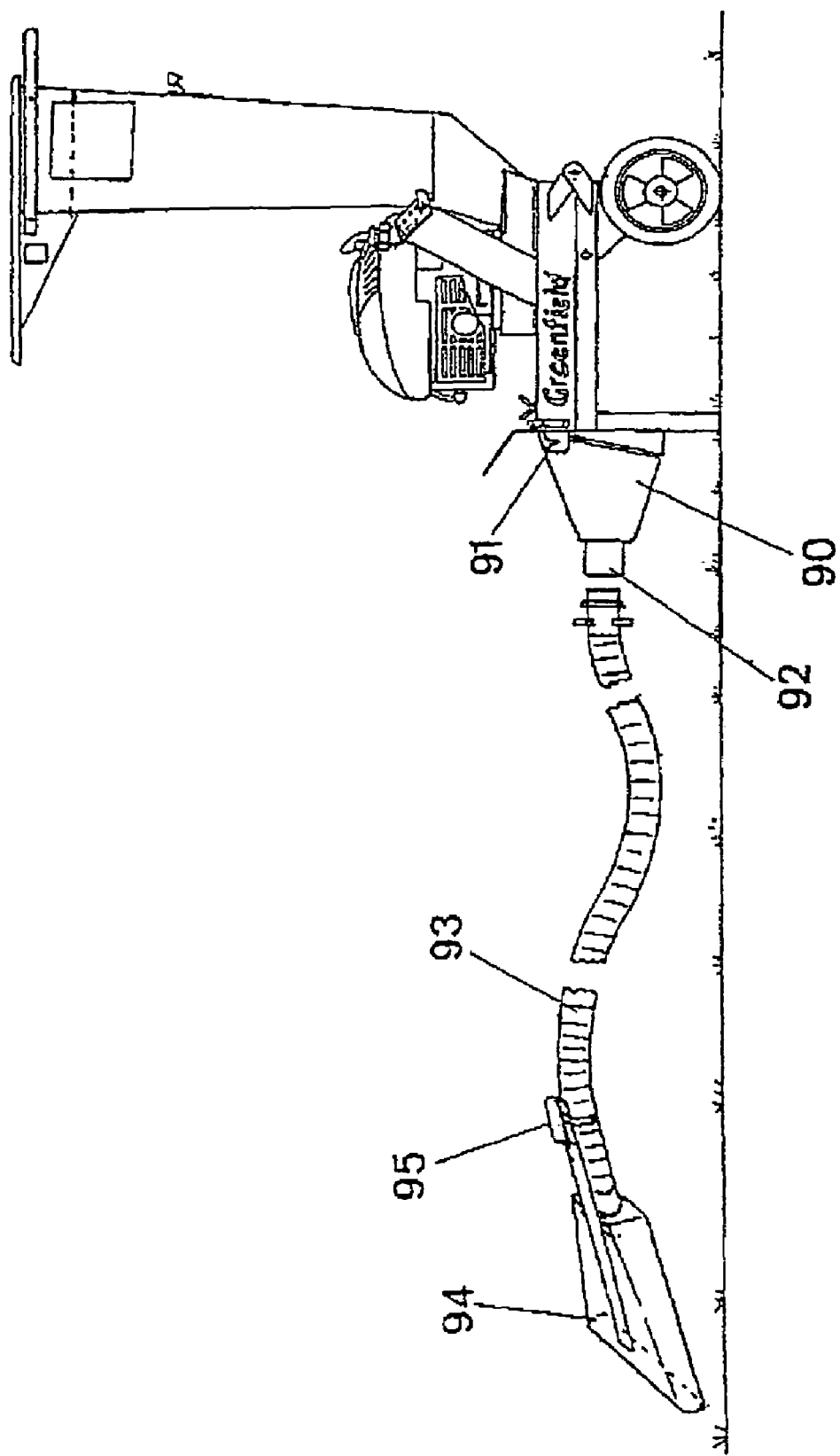

In order to convert the shredder for use as a refuse blower, as shown in FIG. 15 a transition housing 90 is attached to the mountings 91 for the grass catcher and converges to a tubular outlet pipe 92 to which a flexible hose 93 and nozzle assembly 94 may be connected. The nozzle 94 is associated with a handle 95 for manipulation by a user. Thus the air draft created by the fan blades can be used to advantage as a concentrated stream for blowing surfaces clean of loose refuse.

Figure 18:
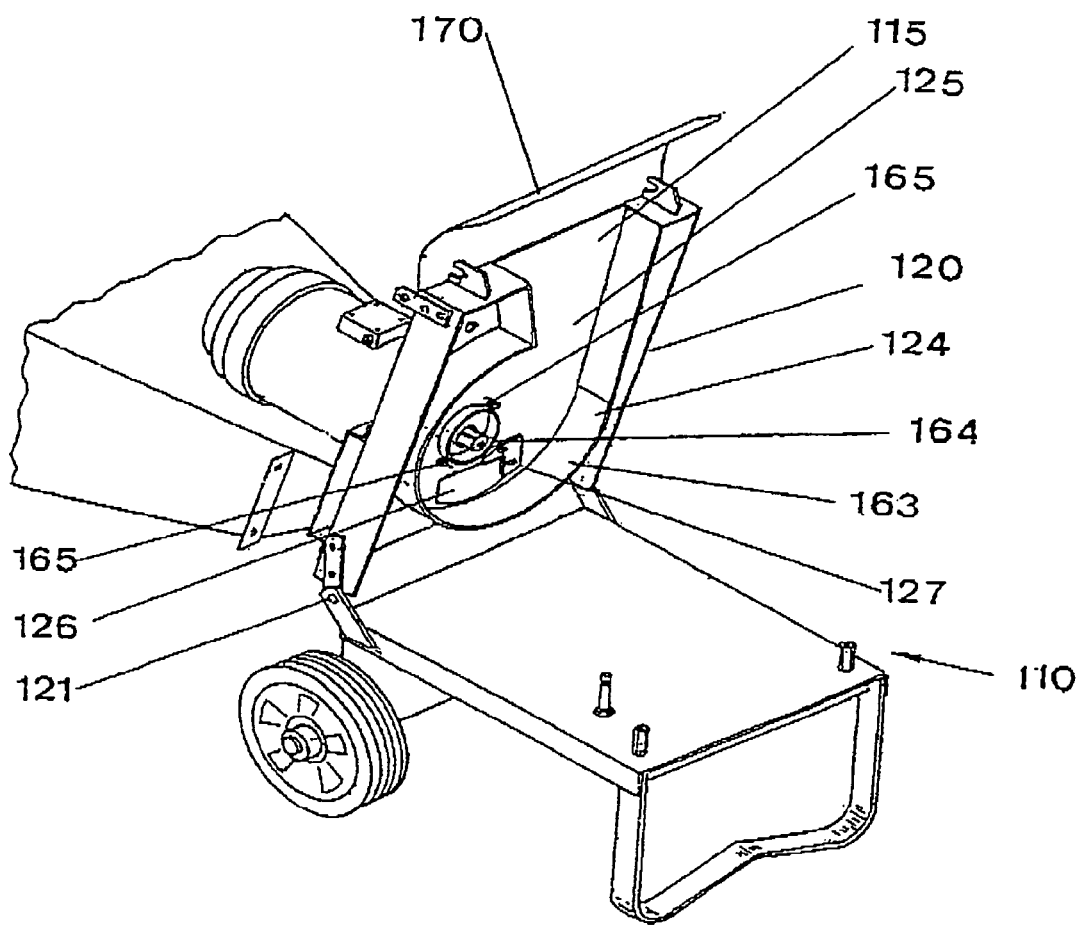
FIG. 18 illustrates the shredder in an open servicing mode.
Figure 19:
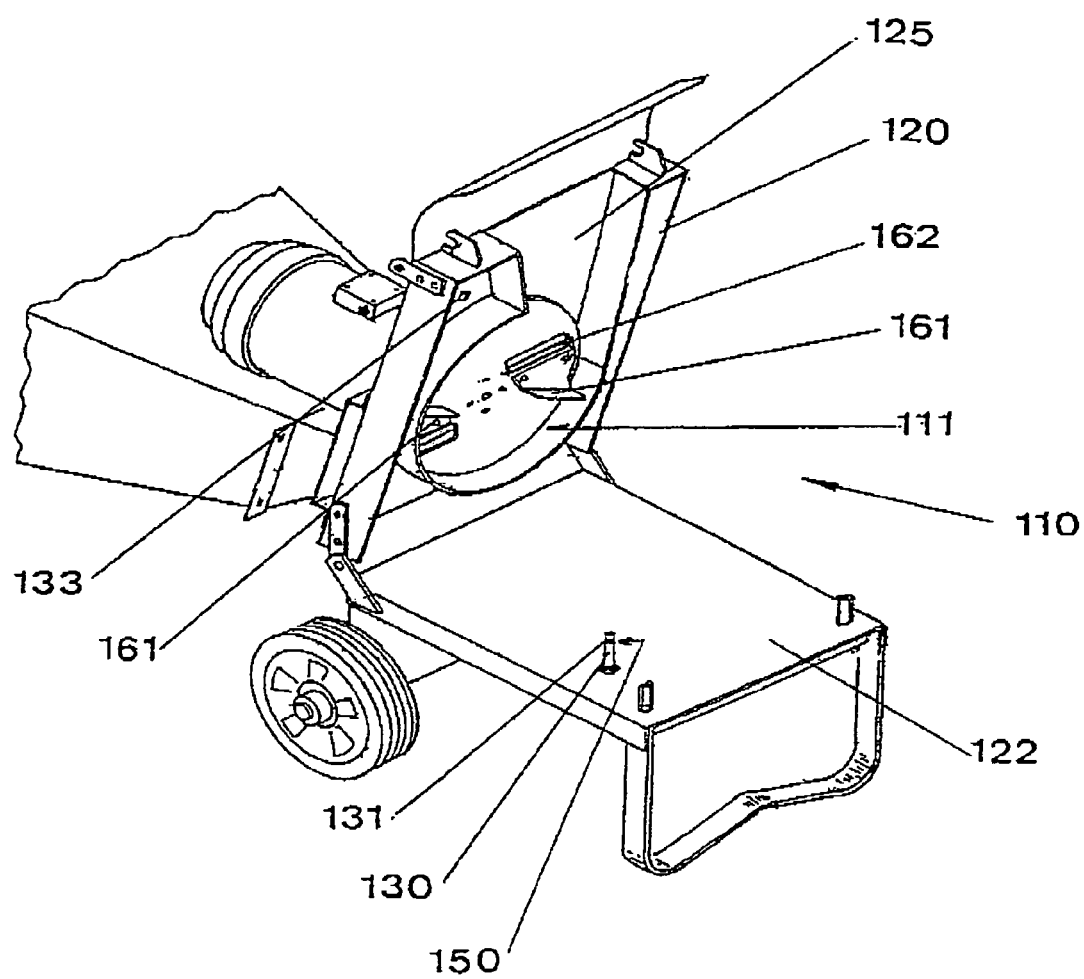
FIG. 19 is a similar view to FIG. 3 but shown with the rotor removed.
Figure 20:
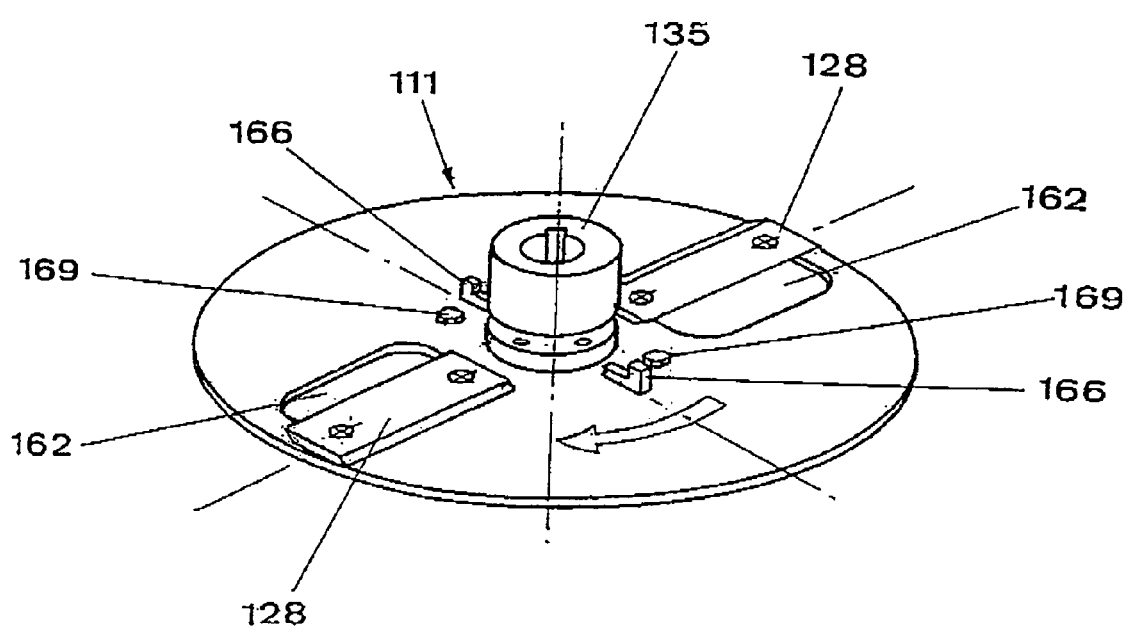
FIG. 20 is a top view of the shredding rotor assembly.

The garden refuse shredder assembly 110 illustrated in FIGS. 16 to 21 of the drawings has a shredding rotor assembly 111, as illustrated in FIG. 20 supported in a housing 112 and driven by an electric motor 113. An inlet chute 114 is provided at the rear of the housing for entry of garden refuse and an outlet chute 115 is provided at the front of the housing through which shredded material is discharged.

In this embodiment, the housing 112 is a two part housing having an upper part 120 pivotally connected by pivots 121 to a base part 122 such that the upper part 120 may be opened as shown in FIGS. 18 and 19 to provide access to the shredding rotor assembly 111. Normally the housing parts are retained in their closed attitude by a pair of wing nuts which bolt the upper part 120 to the base part 122.

Referring to FIG. 19 it will be seen that the shredding rotor assembly 111 is contained within a volute shaped housing 124 formed with an expanding discharge chute 125 extending to the outlet 115. FIG. 19 also illustrates the inlet 126 for refuse to be shredded and the anvil 127 which is bolted to the trailing edge of the inlet 126 and which chipper blades 128 of the shredding rotor assembly 111 co-operate to shear refuse fed through the inlet 126.

Figure 16:
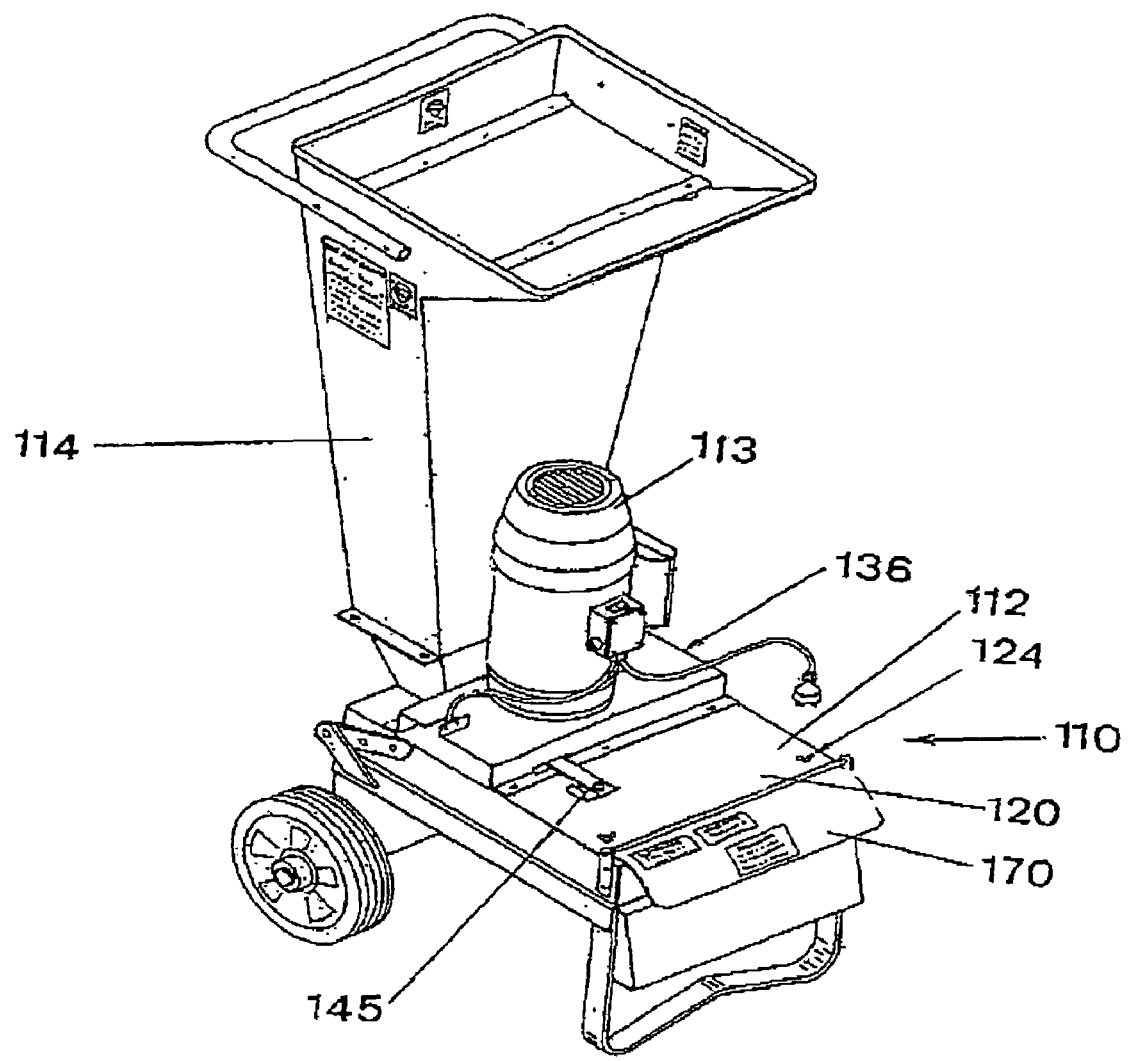
FIG. 16 illustrates an electrically operated shredder in an operative mode.
Figure 17:
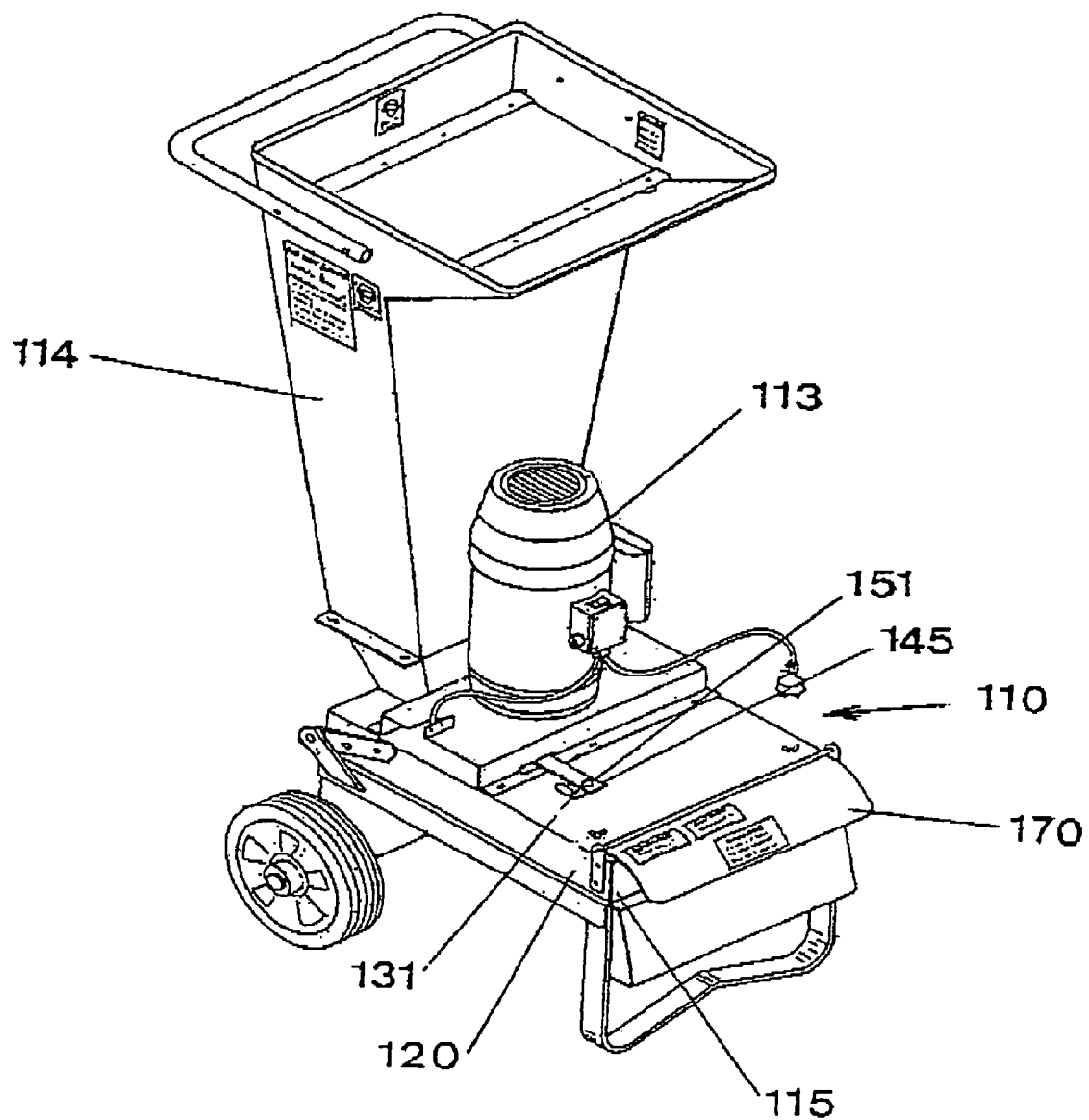
FIG. 17 is a corresponding view but in an inoperative mode.

As shown in FIG. 18 the base part 122 is provided with an upstanding pin 130 which passes through a complementary aperture 133 in the upper housing portion 120 when the housing is closed. The upper end 131 of the pin 130 is then exposed above the upper housing 120 as illustrated in FIGS. 16 and 17.

The shredding rotor assembly 111 is provided with a mounting hub 135 which receives the keyed output shaft of the electric motor 113. The upper portion of the hub 135 extends upwardly above the housing 120 into a cavity formed by an inverted channel shaped motor mounting bracket 136. The motor mounting bracket supports a brake lever 137 which carries a brake pad 138 and tension spring 139 which biases the brake pad 138 into engagement with the upper portion of the hub 135.

The brake lever 137 extends forwardly through the front flange 140 of the motor bracket 136 and beyond the exposed upper end 131 of the pin 130 which projects through the housing 120. An on/off switch 141 is also carried on the motor mounting bracket so as to cooperate with the brake lever such that when the brake lever is disengaged from the hub 135 and held in the "ON" position, it will actuate the switch 141 to an on position such that external electrical power supplied to the shredder will be switched to the motor 113.

When the lever 137 returns to the engaged position, it releases from the switch 141 which becomes open circuit so as to prevent supply of electricity to the motor 113. Once disengaged from an "ON" position, the biasing of the lever 137 will urge the brake pad 138 into braking contact with the hub 135 to brake the rotor assembly 11 to a standstill in a relatively short space of time such as a matter of seconds.

The end 145 of the lever 137 which is exposed above the housing part 120 forms an on/off control switch for the shredder and it is adapted to be retained in the "ON" position by engaging it with the exposed upper end 131 of the pin 130. For this purpose, the upper end 131 of the pin 130 is waisted at 150 and the end 145 of the lever is provided with a keyhole slot 151 whereby the end portion 145 may be captively engaged with the upper end 131 of the pin 130 and held therein by its spring bias.

When so engaged, the switch 141 is maintained closed and power is supplied to the motor 130. When the lever end 145 is released from the pin end 131, the spring 139 will pull the lever 137 to the braking position stopping power supply to the motor and at the same time braking the rotor to a standstill.

Should an operator want to gain access to the rotor assembly 111, the operator may undo the wing nuts 142 with a view to pivoting the upper part 120 of the housing 112 to the open position. This may be achieved provided the on/off lever 137 is not engaged about the upper end of the pin 130. If it is so engaged and the electric motor is powered, then captive engagement of the lever end 145 with the pin end 131 will prevent the upper housing part 120 being pivoted to its open position. Thus the housing cannot be opened to gain access to the rotor assembly 11 unless the lever 125 is in the off position.

Accordingly it will not be possible to gain access to the rotor assembly 111 until the power supply to the motor 113 has been disrupted and the rotor has been braked.

Figure 21:
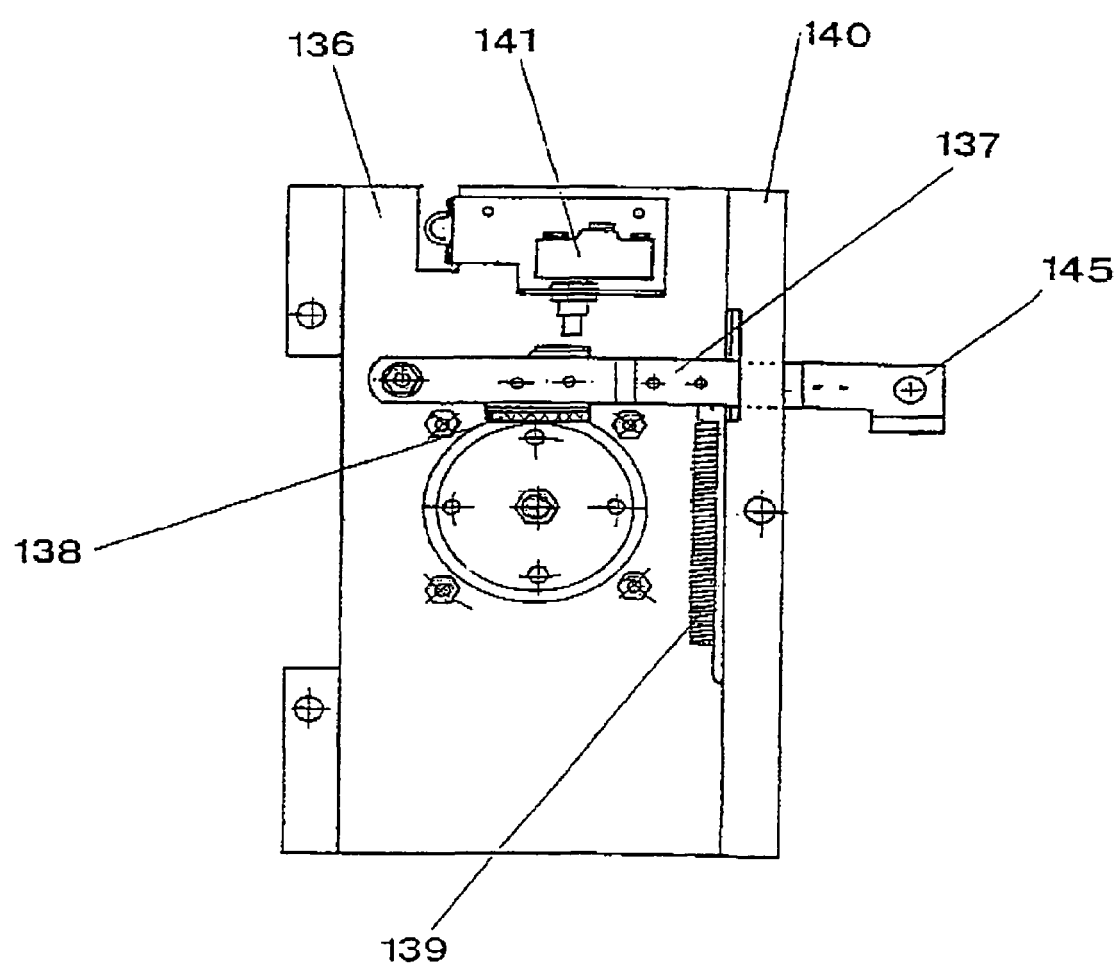
FIG. 21 is an underneath view of the brake assembly.

Referring to FIG. 21 it will be seen that the brake lever 137 is arranged with the pivot mounting at a leading position relative to the rotation of the hub 135 such that the brake assembly is a leading shoe brake assembly which provides a self servo effect to assist actuation by the tension spring 139.

It will also be seen from the drawings that the rotor assembly 111 operates in the volute shaped housing and is provided with fan blades 161 adjacent the apertures 162 in front of the chipper blades 128. The fan blades induce a draft through the feed chute 114 and through the outlet 115 to assist in through flow and discharge of shredded material.

It will be further seen that an annular barrier wall 163 is formed around the output shaft 164 of the motor 113 so as to shroud the hub 135. Fixed circular anvils which are preferably serrated and constituted by the heads of Allen head bolts 165 are mounted adjacent the barrier wall 163 and complementary L-shaped cutting blades 166 extend through slots 167 in the rotor 11. The blades 166 are welded to mounting plates which are bolted to the rotor 11 by trailing bolts 169. The L-shaped cutters 166 pass closely over the outside and lower end of the circular anvils 165 so as to cut up any fibrous material which may pass through the inlet 126 and move inwards above the rotor 11.

In the illustrated embodiment the outlet 115 is provided with a deflector 170 which deflects discharged material towards the ground. The deflector however may be pivoted to an inoperative position so as to permit a catcher to be engaged with the outlet to receive shredded material.

In operation the upper end of the inlet chute 114 is normally covered by a safety flap which does not prevent flow of air induced by the low pressure created by the fan blade 161. Thus once operating, there is a significant air flow induced in the inlet chute to assist feed of material to the cutter assembly and from the outlet to assist in discharge of shredded material.

As the material is fed through the inlet, it is engaged between the anvil 127 and a chipper blades 128 and chipped. It is then flung outwardly and discharged with the aid of the induced draft. This operation can only occur when the lever 145 is engaged about the pin 130 as illustrated in FIG. 16. If the operator desires to service the rotor 11, the upper part of the housing 120 cannot be opened until the lever 145 has been freed from the pin 130 for movement to the braking position. Thereafter the wing nuts 142 can be released to enable the housing parts to be opened. A further accessible master switch may be provided if desired to provide an operator with a direct means of switching the power supplied to the shredder assembly 110 on or off. This may be accommodated on the handle of the shredder assembly 110 or placed elsewhere as desired.

It will of course be realised that the above has been given by way of illustrative embodiment of the invention, all such modifications and variations thereto as would be apparent to persons skilled in the art are deemed to fall within the broad scope and ambit of the invention as is defined in he appended claims.

What is claimed is:
1. Garden refuse shredding apparatus including:
a housing defining a chamber having a refuse inlet for receiving refuse therethrough and a discharge outlet through which shredded material may be discharged;
a feed hopper in communication with said refuse inlet for directing refuse through said refuse inlet into said chamber;
a rotor mounted in said chamber to a vertical drive shaft or hub extending through a wall of said housing, said rotor including a mounting plate connected to and adapted to rotate with said drive shaft or hub about its axis, and one or more chipper blades integral with or mounted to said mounting plate for rotation therewith; and an internal combustion engine having an output shaft co-axial with and solidly connected to said drive shaft or hub for causing said rotor to rotate, said drive shaft or hub being supported in a bearing which is mounted to said wall through which said drive shaft or hub extends and said bearing is adapted to transfer axial working loads from said drive shaft or hub to said housing.

2. Garden refuse shredding apparatus according to claim 1, wherein said drive shaft or hub has a central bore and the output shaft of said engine is engaged in said central bore.

3. Garden refuse shredding apparatus according to claim 2, wherein said drive shalt or hub is locked to said output shaft by a key extending through the wall of said drive shaft or hub and engaging with a key way in said output shaft.

4. Garden refuse shredding apparatus according to claim 3, wherein said key is secured by a collar extending about said drive shaft or hub.

5. Garden refuse shredding apparatus according to claim 4, wherein said collar includes grub screws which engage with said key.

6. Garden refuse shredding apparatus according to claim 1, wherein said bearing is outside said chamber.

7. Garden refuse shredding apparatus according to claim 6, wherein said bearing is a self-aligning bearing having an inner race which is locked to said drive shaft or hub for rotation therewith.

8. Garden refuse shredding apparatus according to claim 1, wherein said bearing is a flange mounted cam lock bearing which is bolted to said housing wall and cam locked to said drive shaft or hub.

9. Garden refuse shredding apparatus according to claim 1, including an engine mounting base operatively connected to said housing and spaced from said housing wall to provide access to said bearing and wherein said internal combustion engine is mounted on said base.

10. Garden refuse shredding apparatus according to claim 1, wherein said mounting plate is spaced from said wall and said drive shaft or hub between said wall and said mounting plate is enclosed by a shroud extending about said drive shaft or hub.

11. Garden refuse shredding apparatus according to claim 10, wherein said rotor includes one or more macerating means integral with or mounted to said mounting plate for rotation therewith adjacent said shroud and adapted to macerate refuse fed into said chamber.

12. Garden refuse shredding apparatus according to claim 1, including fan means in fluid communication with said chamber for creating an outflow of air through said outlet.

13. Garden refuse shredding apparatus according to claim 12, wherein said fan means are integral with or mounted to said mounting plate for rotation therewith.

* * * * *